United States Patent
Keisuke et al.

(10) Patent No.: US 8,678,485 B2
(45) Date of Patent: Mar. 25, 2014

(54) HOLLOW WELDED ASSEMBLED FRAME STRUCTURE

(71) Applicant: Honda Motor Co., Ltd., Tokyo (JP)

(72) Inventors: Kishikawa Keisuke, Wako (JP); Masashi Hagimoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/716,174

(22) Filed: Dec. 16, 2012

(65) Prior Publication Data
US 2013/0154311 A1 Jun. 20, 2013

(30) Foreign Application Priority Data
Dec. 20, 2011 (JP) ................. 2011-278656

(51) Int. Cl.
*B62K 11/04* (2006.01)
*B62K 11/02* (2006.01)

(52) U.S. Cl.
USPC .......................... 296/205; 180/219

(58) Field of Classification Search
USPC ............................ 296/205; 180/219; 280/200
See application file for complete search history.

(56) References Cited

U.S. PATENT DOCUMENTS

| 4,461,366 | A | * | 7/1984 | Honda | 180/229 |
| 5,749,590 | A | * | 5/1998 | Roerig | 280/276 |
| 5,853,651 | A | * | 12/1998 | Lindsay et al. | 264/512 |
| 6,793,031 | B1 | * | 9/2004 | Greene | 180/225 |
| 2001/0028158 | A1 | * | 10/2001 | Devitt et al. | 280/283 |
| 2001/0045312 | A1 | * | 11/2001 | Adachi et al. | 180/219 |
| 2011/0073398 | A1 | * | 3/2011 | Yokoyama et al. | 180/219 |

FOREIGN PATENT DOCUMENTS

JP 11278346 10/1999

* cited by examiner

*Primary Examiner* — Lori Lyjak
(74) *Attorney, Agent, or Firm* — Rankin, Hill & Clark LLP

(57) ABSTRACT

A lower frame and an upper frame, which configure a main frame, are connected to each other by a first reinforcing frame, a second reinforcing frame, a third reinforcing frame, a fourth reinforcing frame, a fifth reinforcing frame, and a sixth reinforcing frame. A first engine hanger is welded to a lower end of the lower frame such that an atmospheric air communicating hole formed in a side face of the first engine hanger communicates with the inside of the lower frame. A first air vent port and a second air vent port for the lower frame and the upper frame and third air vent port formed in a third reinforcing frame and a fourth reinforcing frame are formed in side faces of the abutting portions so that they are not observed from the outside.

20 Claims, 7 Drawing Sheets

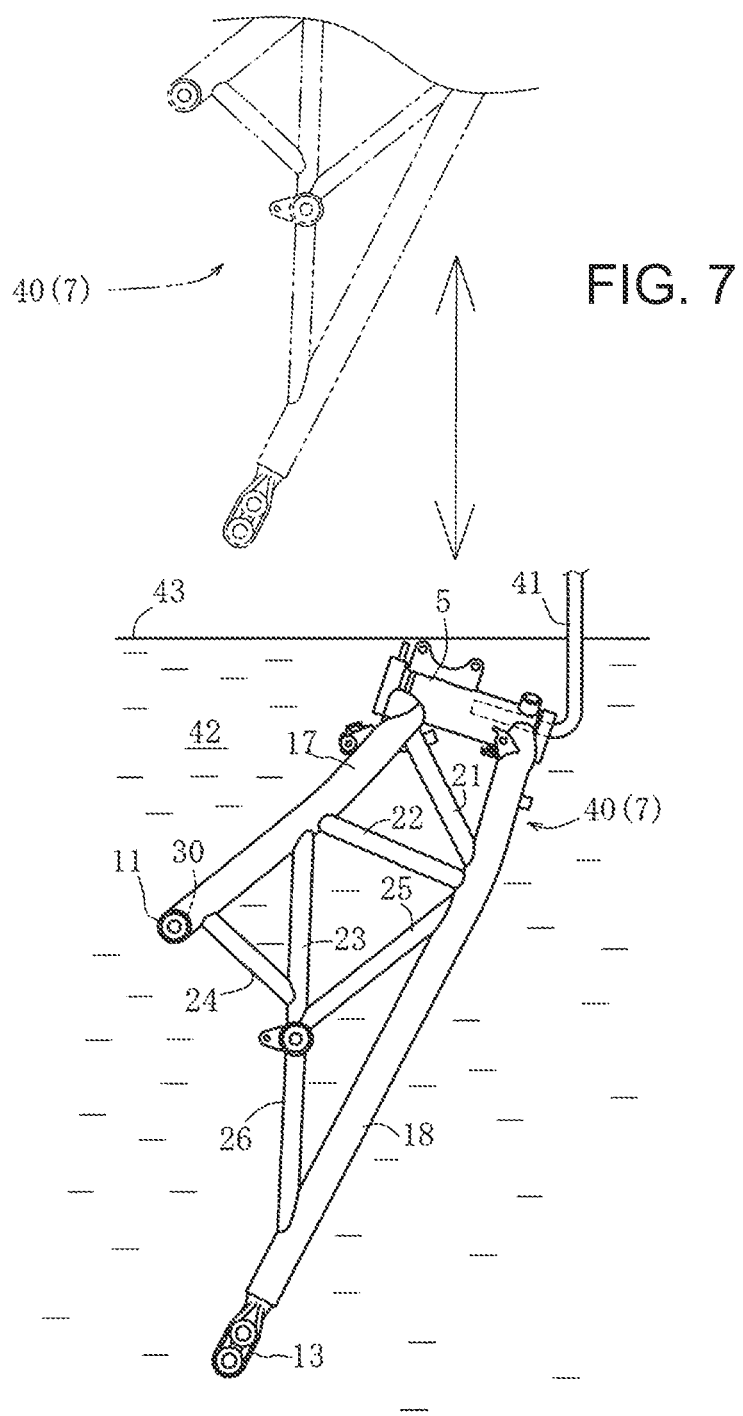

HOLLOW WELDED ASSEMBLED FRAME STRUCTURE

BACKGROUND OF THE INVENTION

The present invention relates to a hollow welded assembled frame structure provided in a saddle type vehicle.

A hollow welded assembled frame formed a plurality of hollow members such as metal pipes, and connecting the hollow members by welding is publicly known. See, for example, Japanese Patent No. 4015265.

SUMMARY OF THE INVENTION

Incidentally, when a plurality of hollow members are connected to each other by welding, it is necessary to provide an air vent port for removing the air of the hollow members in a communicating relationship with the atmospheric air.

However, if the air vent port is opened directly to the atmospheric air and a plurality of air vent ports are provided for each of welded portions of the hollow members, then plural ones of the air vent ports are observed in an outer appearance of the frame after assembly by welding, and prevents improvement in the vehicle outer appearance. Besides, during operation of the vehicle, water is likely to intrude into a hollow portion of the frame through the air vent ports opened to the atmospheric air. If the intruding water advances to the interior or the hollow portion, then it is less likely to discharge.

Furthermore, after the frame is assembled by welding it is sometimes coated in a dipping process. In this instance, upon dipping of the frame in the liquid paint, the liquid paint intrudes into a hollow member through an air vent port, and therefore, labor for discharging the liquid paint later is required. Particularly if the liquid paint enters the interior of the hollow portion, then much time is required for the discharge of the liquid paint.

The present invention has been made in view of such circumstances as described above, and it is an object of the present invention to provide a hollow welded assembled frame structure having a reduced number of air vent ports.

In order to solve the problem described above, according to the invention there is provided a hollow welded assembled frame structure wherein a plurality of hollow members of a tubular shape are integrally assembled by connecting the hollow members to each other by welding. The hollow members include at least a first hollow member, a second hollow member and a third hollow member.

The first hollow member is closed at openings at the opposite ends in a lengthwise direction thereof and has only one atmospheric air communicating hole provided at one end portion in the lengthwise direction thereof so as to communicate an internal hollow space thereof and the atmospheric air with each other. The second hollow member is welded at an opening at one end in a lengthwise direction thereof to a side face of the first hollow member in a state in which the second hollow member is abutted with the side face of the first hollow member and is connected in a communicating state through a first air vent port that is provided at the connecting portion of the second hollow member and communicates the hollow spaces of the first hollow member and the second hollow member with each other. The third hollow member is closed up at openings at the opposite ends in a lengthwise direction thereof and has a side face to which the second hollow member is welded at the other end thereof in a state in which the other end of the second hollow member is abutted with the side face of the third hollow member such that the third hollow member is connected to the second hollow member in a communicating state through a second air vent port, which is provided at the connecting portion of the third hollow member, and communicates hollow spaces of the third hollow member and the second hollow member with each other. The first air vent port and the second air vent port are formed as hidden holes that are hidden by the second hollow member welded with the openings abutted therewith so as not to be observed from the outside. The first air vent port is provided at a position spaced by a predetermined distance from the atmospheric air communicating hole in the lengthwise direction of the first hollow member.

According to the present invention, the only one atmospheric air communicating hole is provided at one end portion in the lengthwise direction of the first hollow member. Further, the first hollow member and the second hollow member are connected to each other in a communicating state by the first air vent port formed as a hidden port while the second hollow member and the third hollow member are connected to each other in a communicating state by the second air vent port formed as a hidden port. Therefore, upon assembly of the plural hollow members by connection thereof to each other by welding, when the third hollow member is welded, even though the only one atmospheric air communicating hole is provided, air venting can be carried out in the route of the second air vent port→first air vent port→atmospheric air communicating hole.

Consequently, even if a plurality of air vent ports necessary for air venting upon welding are provided, the number of those air vent ports formed in an externally observable region can be restricted to only one of the atmospheric air communicating hole. Therefore, the outer appearance can be improved. Further, liquid such as water becomes less likely to intrude. Specifically, the atmospheric air communicating hole is provided at one end portion of the first hollow member and the first air vent port is provided in a spaced relationship by the predetermined distance from the atmospheric air communicating hole in the lengthwise direction of the first hollow member. Therefore, even if liquid intrudes into the first hollow member through the atmospheric air communicating hole, it is less likely to further intrude to the interior from the first air vent port and discharge of the liquid is made easy.

In further accordance with the present invention, the hollow welded assembled frame structure includes a main frame that extends rearwardly from an upper portion of a head pipe as viewed in side elevation of a saddle type vehicle. The main frame includes an upper frame and a lower frame provided in an upwardly and downwardly spaced relationship from each other, and a plurality of reinforcing frames each formed from a hollow member and connecting the upper frame and lower frames to each other. The lower frame serves as the first hollow member and has the atmospheric air communicating hole provided at a lower end portion thereof. The upper frame serves as the third hollow member. The first reinforcing frame, which is positioned adjacent the head pipe from among the reinforcing frames, serves as the second hollow member. The lower frame and the first reinforcing frame are connected in a communicating state with each other through the first air vent port. The upper frame and the first reinforcing frame are connected in a communicating state with each other through the second air vent port. Therefore, air venting upon assembly by welding can be carried out through the atmospheric air communicating hole and the number of air vent ports to be observed from the outside can be reduced as far as possible, and consequently, the outer appearance required for the main frame can be improved. Besides, upon running, intrusion of water into the hollow frames can be prevented.

In further accordance with the present invention, the reinforcing frames include a second reinforcing frame disposed rearwardly of the first reinforcing frame and connected at one end thereof to the lower frame in a non-communicating state between the atmospheric air communicating hole and the first air vent port and at the other end thereof to the upper frame in a communicating state. Therefore, even if liquid intrudes into the lower frame through the atmospheric air communicating hole, since a communicating hole with the second reinforcing frame is not provided between the atmospheric air communicating hole and the first air vent port, the liquid cannot intrude to the second reinforcing frame side. Further, since the first air vent port is spaced by the predetermined distance from the atmospheric air communicating hole provided at the lower end portion, the liquid is less likely to reach the first air vent port. Consequently, the liquid is less likely to further intrude to the interior from the first air vent port and besides discharge of the liquid is facilitated. Further, upon welding, air venting can be carried out in the route of the second reinforcing frame→upper frame→first reinforcing frame→lower frame→atmospheric air communicating hole.

In further accordance with the present invention, the reinforcing frames include a third reinforcing frame and a fourth reinforcing frame. The third reinforcing frame and the fourth reinforcing frame are disposed rearwardly of the first reinforcing frame and are connected at respective one ends thereof to the lower frame in a non-communicating state between the atmospheric air communicating hole and the first air vent port. The third reinforcing frame and the fourth reinforcing frame are connected at the other ends thereof to each other in a communicating state, and are also connected to the upper frame in a communicating state through a fifth hollow member, which is a different hollow member. Therefore, liquid intrusion to the third and fourth reinforcing frames side does not occur, and upon welding, air venting can be carried out along the route of the third or fourth reinforcing frame→fifth reinforcing frame→upper frame→first reinforcing frame→lower frame→atmospheric air communicating hole.

In further accordance with the present invention, a lower end opening of the lower frame is connected by an engine hanger of a cylindrical shape disposed in the vehicle widthwise direction, and the atmospheric air communicating hole is formed in a cylindrical portion of the engine hanger. As such, the end portion opening of the lower frame is closed up with the engine hanger in the form of a cylindrical member, and the atmospheric air communicating hole can be provided by configuring a through-hole in a tubular portion of the engine hanger. Therefore, the atmospheric air communicating hole can be formed readily, and workability is improved.

In further accordance with the present invention, left and right main frames are provided and connected to and integrated by the head pipe and are connected to each other in a non-communicating state. Each of the left and right main frames includes the atmospheric air communicating hole. Therefore, intrusion of liquid from one of the main frames to the depth of the other main frame can be blocked.

In further accordance with the present invention, the hollow welded assembled frame includes hollow cross members extending in the vehicle widthwise direction, for connecting the left and right main frames to each other. The cross members connect on one end sides thereof in a communicating state and on the other end sides thereof in a non-communicating state to the paired left and right main frames. Consequently, the left and right main frames can be placed in a non-communicating state with each other, and air venting upon welding of the cross members can be possible through only one of the main frames. In addition, the number of through-holes to be formed in the main frames can be reduced to assure the main-frame strength.

In further accordance with the present invention, the cross members include a first cross member and a second cross member provided upwardly and downwardly. The first cross member connects the left and right lower frames to each other. The second cross member connects the left and right upper frames to each other. Consequently, intrusion of liquid from one to the other of the left and right frames can be blocked, and the number of through-holes to be formed in the main frames can be reduced to assure the main-frame strength.

In further accordance with the present invention, the hollow welded assembled frame structure is coated by dipping the same into liquid paint after assembly by welding thereof. Upon painting, the first hollow member is disposed above a liquid surface of the fluid paint such that a lengthwise direction thereof is directed in an upward and downward direction. In this arrangement state, the atmospheric air communicating hole is open downwardly at a lower end portion thereof while the first air vent port is provided so as to be positioned on an upper end portion side.

Therefore, when the frame is dipped into the liquid paint, since the atmospheric air communicating hole is provided at only one place and besides is provided at the lower end portion of the first hollow member, the liquid paint is less likely to intrude into the hollow portions of the frame from the atmospheric air communicating hole. Besides, since the first air vent port is provided on the upper end portion side, even if the liquid paint should intrude to the lower end portion side of the first hollow member, it is less likely to reach the first air vent port. Consequently, the liquid paint is less likely to intrude to the hollow portions of the second hollow member and the third hollow member toward the interior side with respect to the first hollow member. Moreover, if the frame is pulled up from within the liquid paint, then the intruding liquid paint can be discharged quickly through the atmospheric air communicating hole.

BRIEF DESCRIPTION OF THE DRAWINGS

FIG. 7 is a view illustrating a coating step of a front frame assembly.

DETAILED DESCRIPTION OF THE PREFERRED EMBODIMENTS

In the following, an embodiment wherein the present invention is applied to a vehicle body frame of a motorcycle which is an example of a saddle type vehicle is described. It is to be noted that, in the present application, upward and downward, leftward and rightward, and forward and backward directions of a frame are represented with reference to a vehicle in which the frame is used. Further, in accordance with the necessity, the forward direction is indicated by an arrow mark F, the upward direction is indicated by an arrow mark UP, and the leftward direction is indicated by an arrow mark LH in the figures.

Figure 1:
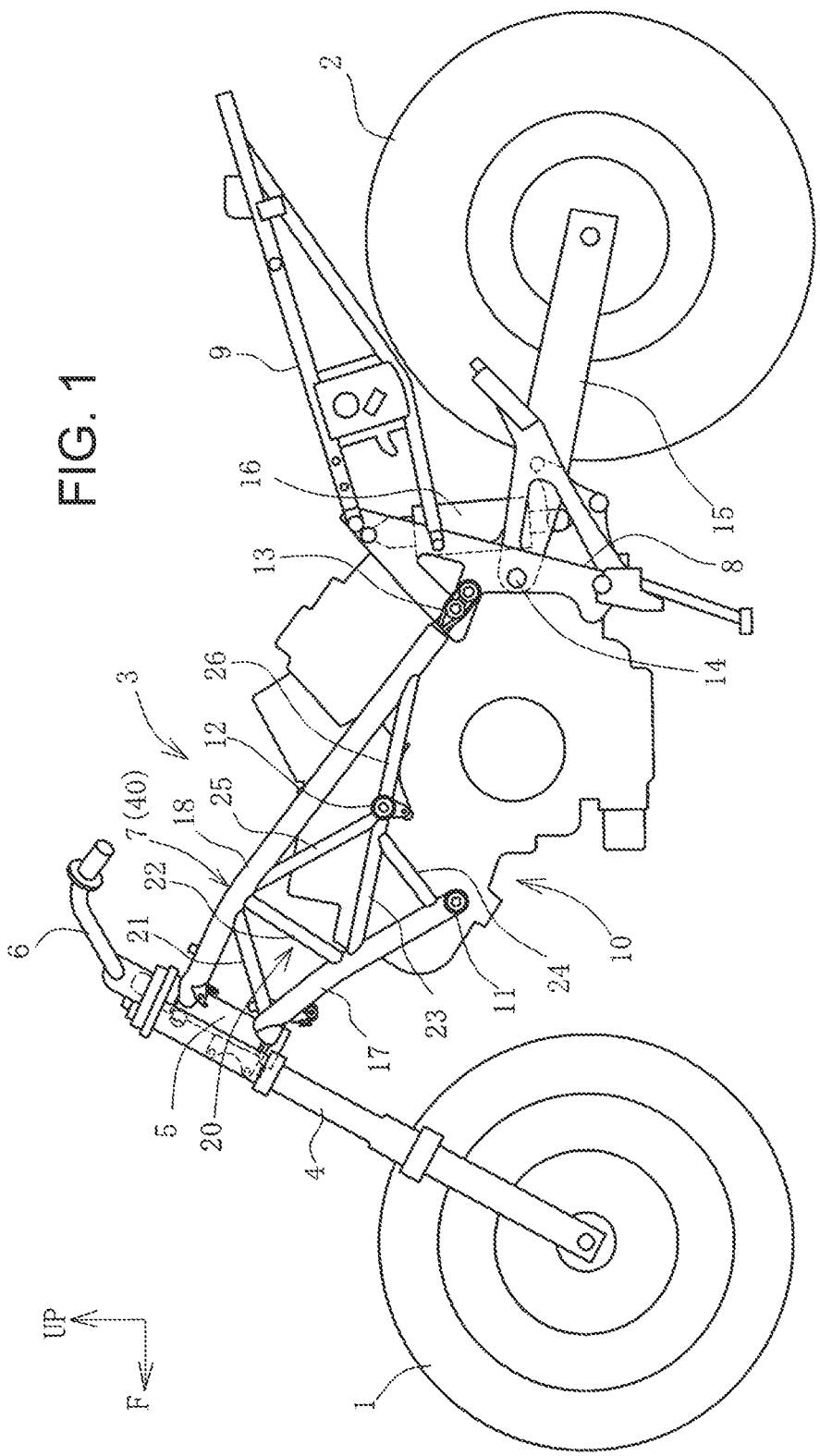
FIG. 1 is a left side elevational view of part of a motorcycle to which the present invention is applied.

FIG. 1 is a side elevational view of part of a motorcycle in which a pipe frame according to the present invention is used. The motorcycle includes a vehicle body frame 3 that supports a front wheel 1 and a rear wheel 2 at front and rear portions thereof, respectively. The front wheel 1 is supported at lower ends of a pair of left and right front forks 4, and the front forks 4 are supported at an upper end thereof for pivotal motion on a head pipe 5 provided at a front and of the vehicle body frame 3 such that the front wheel 1 is steered by a handlebar 6.

The vehicle body frame 3 includes left and right main frames 7, left and right pivot frames 8, and left and right seat rails 9 provided integrally with each other. The pivot frames 8 are connected to a rear end of the main frames 7 and disposed long in the upward and downward direction. The seat rails 9 extend obliquely upwardly rearwards from an upper end portion of the pivot frames 8 and support a seat (not shown) thereon.

The main frames 7 correspond to frames formed by assembling a plurality of pipe members (which correspond to hollow members in the present invention) according to the present invention by welding. An engine 10 is supported on the main frames 7 and the pivot frames 8. Reference numerals 11 and 12 denote first and second engine hangers for supporting the engine 10 provided on the vehicle body frame 3, respectively.

Reference numeral 13 denotes an attachment piece provided at a rear end of each main frame 7, and the attachment piece 13 is fastened to the pivot frame 8 to integrate the main frame 7 and the pivot frame 8 with each other. A fuel tank (not shown) and so forth are supported on the main frames 7.

Each of the rear swing arms 15 are supported at front ends thereof for pivotal motion on the pivot frames 8 by a pivot 14. The rear wheel 2 is supported at a rear end of the rear swing arms 15. A rear cushion unit 16 is interposed between a front portion of the rear swing arms 15 and the seat rails 9 and buffers rocking motion in the upward and downward directions around the pivot 14 of the rear swing arms 15 thereby to configure a rear suspension.

Figure 2:
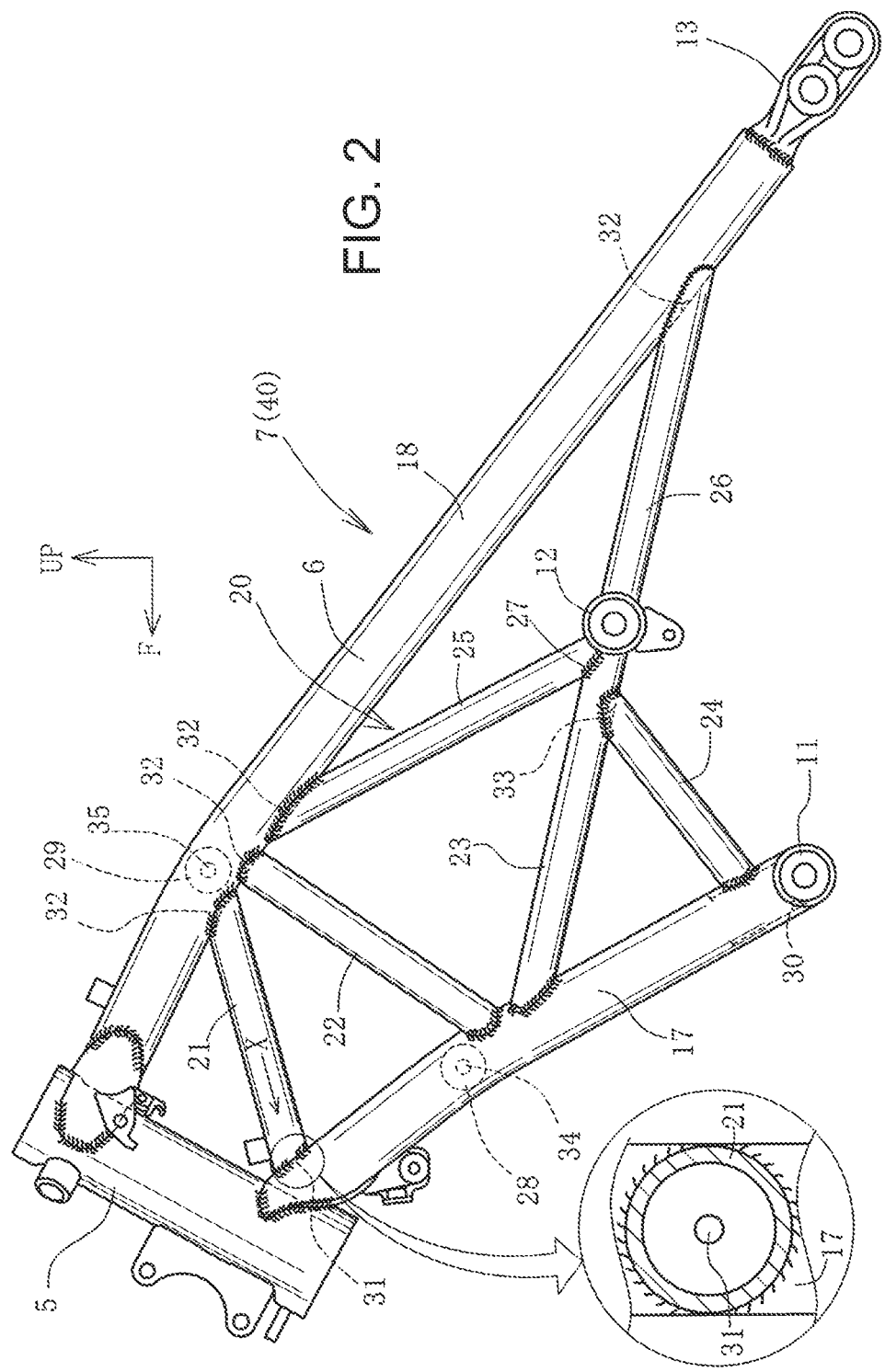
FIG. 2 is a left side elevational view of a main frame.
Figure 3:
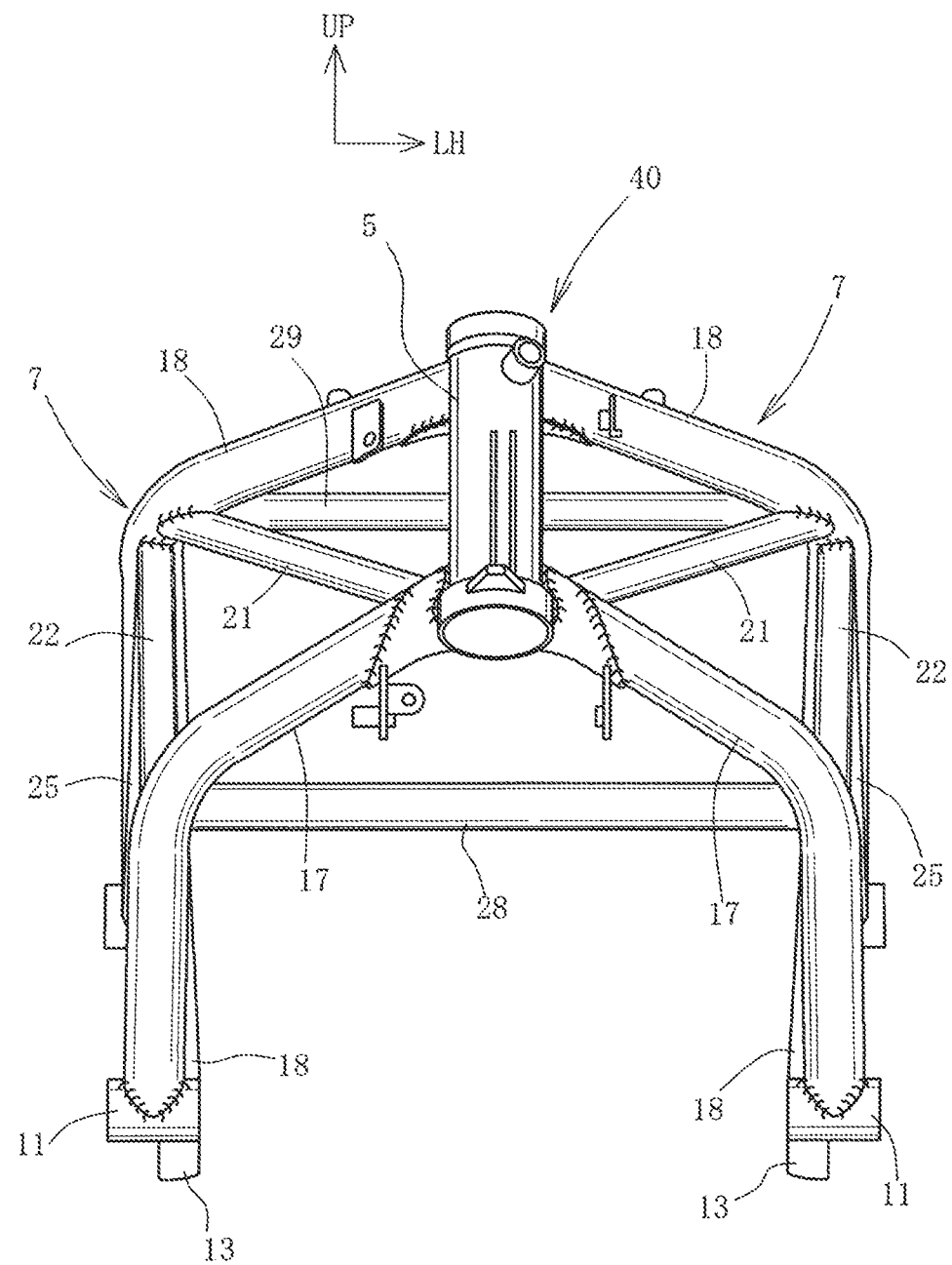
FIG. 3 is a front elevational view of the main frame.
Figure 4:
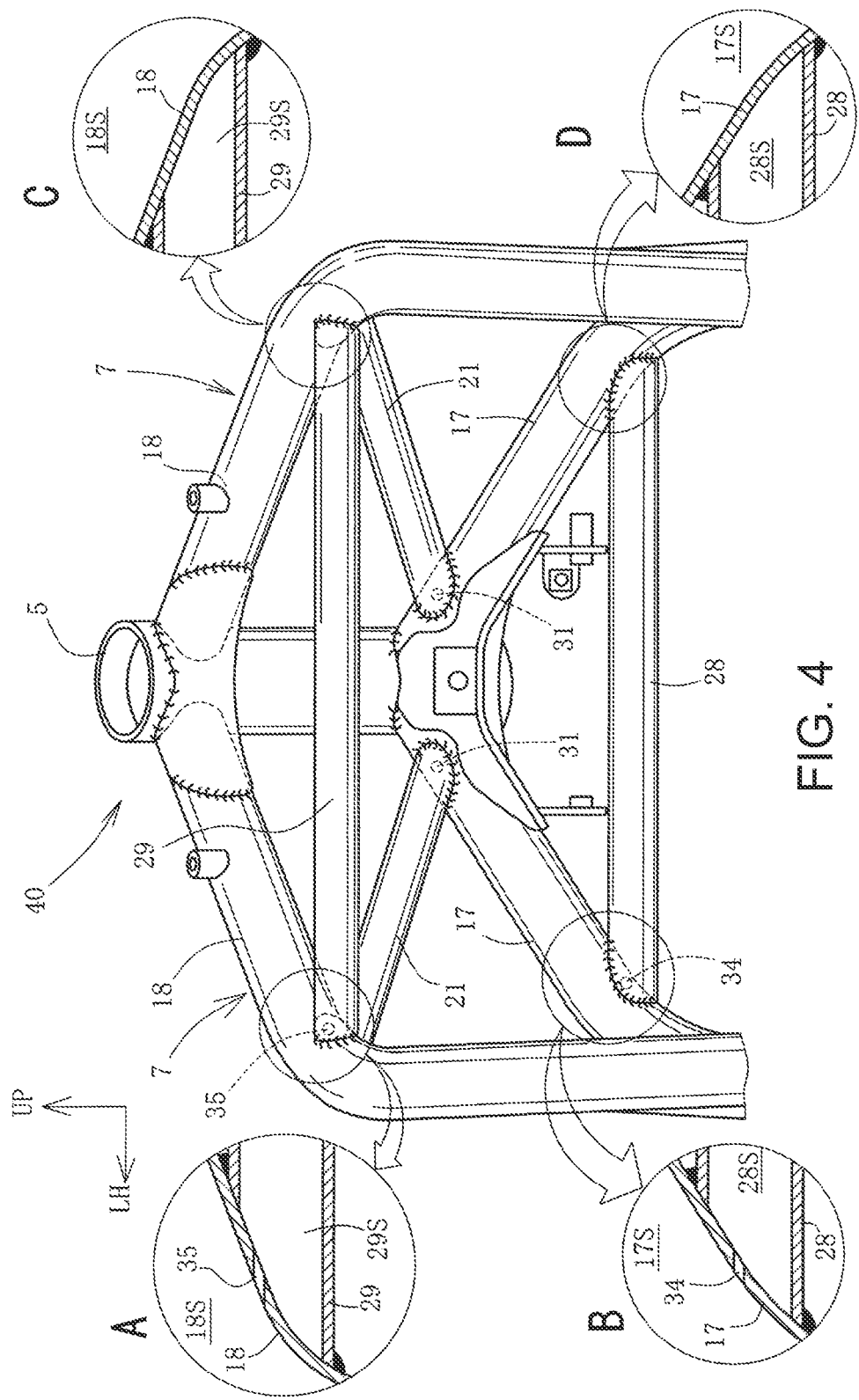
FIG. 4 is a rear elevational view of the main frame.

Now, a structure of the main frame is described in detail. FIG. 2 is a left side elevational view, FIG. 3 is a front elevational view, and FIG. 4 is a rear elevational view of the main frame 7.

As shown in the aforementioned figures, the main frame 7 corresponds to a welded assembly that extends obliquely rearwardly downwards while it is widened to the left and right from the head pipe 5 and is generally configured from a plurality of pipe members. It is to be noted that the left and right main frames 7 are integrated by connection thereof by the head pipe 5 and cross pipes hereinafter described and configure a front frame assembly 40.

Each of the main frames 7 includes a lower frame 17 and an upper frame 18 disposed in an upwardly and downwardly spaced relationship from each other and extending obliquely downwardly rearwards as viewed in side elevation. The lower frame 17 and the upper frame 18 are each formed from a pipe member, which is open at the opposite ends thereof in the lengthwise direction thereof, and the lower frame 17 corresponds to a first hollow member in the present invention while the upper frame 18 corresponds to a third hollow member in the present invention. It is to be noted that the openings at the front and rear end portions of the lower frame 17 and the upper frame 18 are closed by welding thereto of other members, as hereinafter described.

The lower frame 17 and the upper frame 18 are abutted at a front end portion thereof with a side face of a tubular portion of the head pipe 5 in the form of a hollow tube, and are welded at the abutted portions thereof such that they are integrated with the head pipe 5 and, besides the front end openings, are closed with the head pipe 5. Accordingly, the head pipe 5 serves as a front end closing member for the lower frame 17 and the upper frame 18.

The lower frame 17 is abutted and welded at a rear end (which also is a lower end) thereof to a side face of the first engine hanger 11, formed from a tubular member disposed such that it is directed in the leftward and rightward direction. The lower frame 17 is closed up at an opening at the rear end thereof with the first engine hanger 11. The first engine hanger 11 serves as a rear end closing member for the lower frame 17.

The upper frame 18 extends rearwardly longer than the lower frame 17 and is closed up at the rear end thereof with the attachment piece 13 welded thereto. The attachment piece 13 serves as a rear end closing up member for the rear end opening of the upper frame 18. However, as hereinafter described, an atmospheric air communicating hole 30, which is one of air vent ports and is communicated directly with the atmospheric air, is provided in the first engine hanger 11, and the hollow portion of the lower frame 17 is communicated with the atmospheric air on the outer side of the first engine hanger 11.

A state in which, when the opening end portion of a pipe member such as the lower frame 17 is closed up with a different member, it is not closed fully but is communicated with an air vent port in this manner is represented as closed in a communicating state. Further, such connection of the pipe member is referred to as connection in a communicating state. On the other hand, an opening of a pipe member is closed fully with a different member in which an air vent port is not formed is represented as closed in a non-communicating state. Such connection of the pipe member is referred to as connection in a non-communicating state.

Further, between the lower frame 17 and the upper frame 18 of each of the left and right main frames 7, a side face reinforcing member 20 is provided, which forms a truss structure. The side face reinforcing member 20 is configured from a plurality of pipe members that correspond to reinforcing frames in the present invention.

In the present example, a first reinforcing frame 21, a second reinforcing frame 22, a third reinforcing frame 23, a fourth reinforcing frame 24, a fifth reinforcing frame 25, and a sixth reinforcing frame 26 are provided in order from the front side. However, an arbitrary number of such reinforcing frames may be provided. The reinforcing frames are disposed in such a manner as to cooperate with the lower frame 17 and the upper frame 18 to form a truss structure as viewed in side elevation (FIG. 2).

The first reinforcing frame 21 corresponds to a second hollow member in the present invention and is disposed in an obliquely forwardly downwardly inclined relationship as viewed in side elevation in a neighboring relationship rearwardly of the head pipe 5. The first reinforcing frame 21 is abutted and welded at the opposite ends thereof with and to side faces of tubular portions of the lower frame 17 and the upper frame 18 and is closed up at openings at the opposite ends thereof with the lower frame 17 and the upper frame 18, respectively. However, as hereinafter described, the first reinforcing frame 21 is connected to the lower frame 17 and the upper frame 18 such that the hollow spaces thereof are communicated with each other. The second reinforcing frame 22 to fourth reinforcing frame 24 are connected in a non-communicating state to the lower frame 17 and correspond to third hollow members in the present invention.

The second reinforcing frame 22 is disposed rearwardly of, and in a steeper inclination than, the first reinforcing frame 21, and connects a front portion of the upper frame 18 rearwardly of, and in the proximity of, the portion of the upper frame 18 to which the upper end portion of the first reinforcing frame 21 is connected and an intermediate portion of the lower frame 17 in the longitudinal direction to each other.

The third reinforcing frame 23 is abutted and welded at a front end thereof with and to a portion of the lower frame 17 in the proximity of and on the rear side of the portion of the lower frame 17 to which the second reinforcing frame 22 is connected, and is closed at an opening at the front end thereof by the lower frame 17. The third reinforcing frame 23 extends rearwardly substantially horizontally and is abutted and welded at a rear end thereof with and to a side face of the second engine hanger 12, and is closed up at an opening at the rear end thereof by the second engine hanger 12.

The fourth reinforcing frame 24 connects a rear end portion of the lower frame 17 in the proximity of and on the front side of the first engine hanger 11 and a rear end portion of the third reinforcing frame 23 in the proximity of and on the front side of the second engine hanger 12 to each other. The fourth reinforcing frame 24 is abutted and welded and consequently closed up at the opposite upper and lower ends thereof with, to and by side faces of the lower frame 17 and the third reinforcing frame 23.

A portion of the upper frame 18 in the proximity of and on the rear side of the connection point between the upper frame 18 and the second reinforcing frame 22 and a rear end portion of the third reinforcing frame 23 are connected to each other by the fifth reinforcing frame 25 disposed obliquely rearwardly downwards. The fifth reinforcing frame 25 is abutted, welded and closed up at an upper end thereof with, to and by the upper frame 18. The fifth reinforcing frame 25 is abutted and welded at a lower end thereof with and to a rear end of the third reinforcing frame 23 and is further abutted and welded at the lower end thereof with and to a side face of the second engine hanger 12. The connection portion of the fifth reinforcing frame 25 to the rear end of the third reinforcing frame 23 is a butt welded portion 27 cut obliquely.

The third reinforcing frame 23 and the sixth reinforcing frame 26 are disposed substantially horizontally on a substantially straight line with the second engine hanger 12 interposed therebetween, and connect a portion of the lower frame 17 rearwardly and in the proximity of the connection portion thereof to the second reinforcing frame 22 and a rear end portion of the upper frame 18 in the proximity of the welded portion to the attachment piece 13 to each other.

The sixth reinforcing frame 26 is abutted and welded at a front end thereof with and to a side face of a rear side of the second engine hanger 12 and is abutted and welded at a rear end thereof to the lower side of a side face of the upper frame 18. The front end and the rear end of the sixth reinforcing frame 26 are closed.

As shown in FIGS. 3 and 4, the left and right lower frames 17 are connected to each other by a first cross pipe 28, which is a reinforcing frame disposed substantially horizontally in the leftward and rightward direction, and the left and right upper frames 18 are connected to each other by a second cross pipe 29.

The first cross pipe 28 is a reinforcing frame disposed in parallel to and below the second cross pipe 29 and forms a truss structure together with the left and right lower frames 17 as viewed in plan view. Also the second cross pipe 29 forms a truss structure together with the left and right upper frames 18 as viewed in plan view.

Each of the first cross pipe 28 and the second cross pipe 29 configures a cross member in the present invention. The first cross pipe 28 connects the inner sides of intermediate portions of the left and right lower frames 17 and is abutted and welded at the opposite ends thereof with and to the inner side faces of the lower frames 17 such that openings at the opposite ends thereof are closed. Also the second cross pipe 29 is provided between the inner sides of intermediate portions of the left and right upper frames 18 and is abutted and welded at the opposite ends thereof to the inner side faces of intermediate portions of the left and right upper frames 18 such that openings at the opposite ends thereof are closed similarly.

Figure 5:
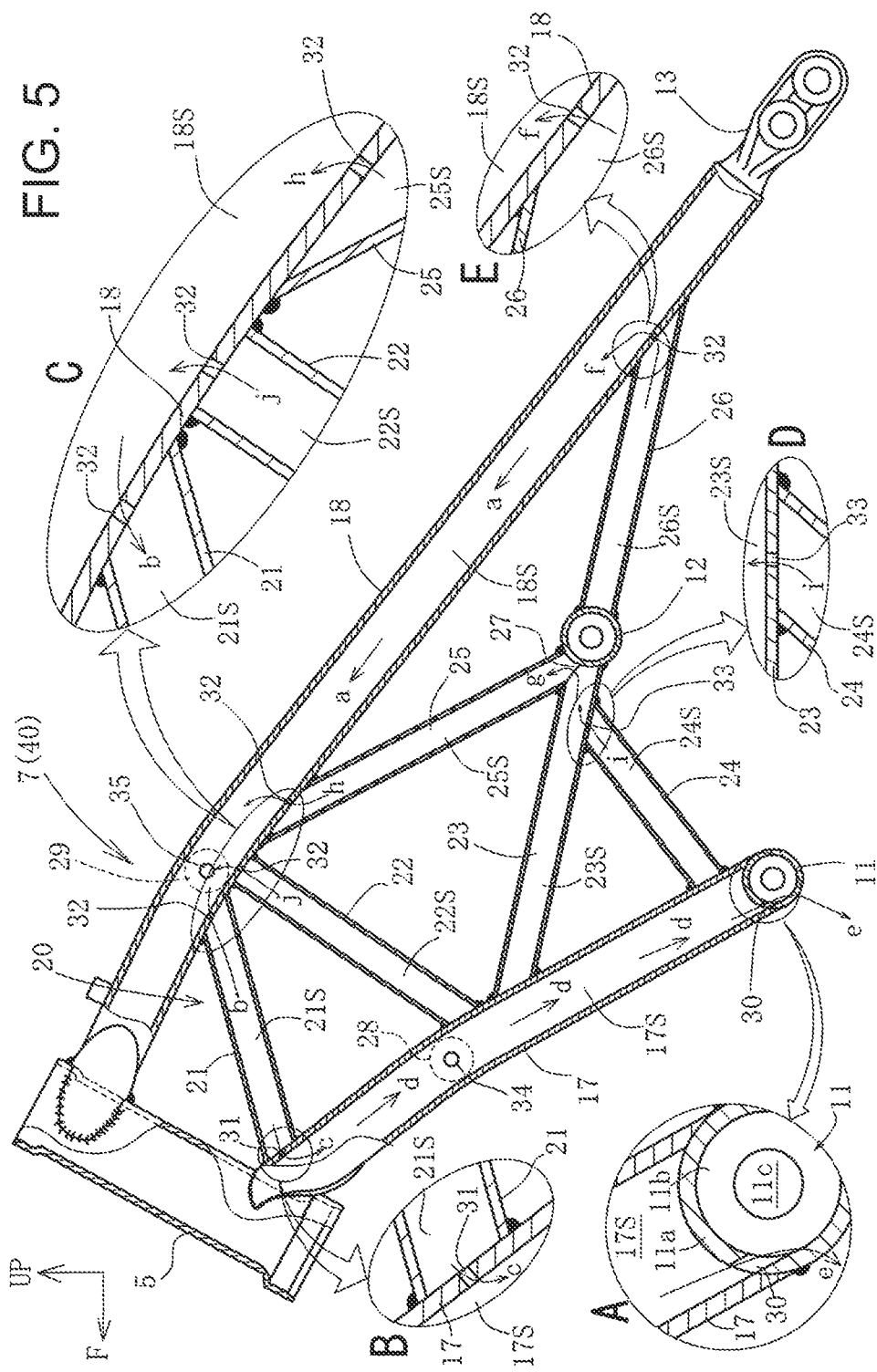
FIG. 5 is an explanatory view showing connection portions of the main frame in cross section.

FIG. 5 is an explanatory view showing the connection portions of the pipe members to the left side main frame 7 in section. As indicated by an enlarged portion A in FIG. 5, a hollow space 17S of the lower frame 17 is communicated with the atmospheric air through an atmospheric air communicating hole 30 provided in the first engine hanger 11 and is open to the atmospheric air at the atmospheric air communicating hole 30. It is to be noted that, as hereinafter described, since hollow spaces of the pipe members (17, 18 and 20 to 26) which configure the main frame 7 form a single continuous main frame space, the atmospheric air communicating hole 30 serves as an atmospheric air opening hole of the main frame space. Besides, since the main frame space is closed with respect to the atmospheric pressure except for the atmospheric air communicating hole 30, the atmospheric air communicating hole 30 serves as the only atmospheric air opening hole of the main frame 7.

Figure 6:
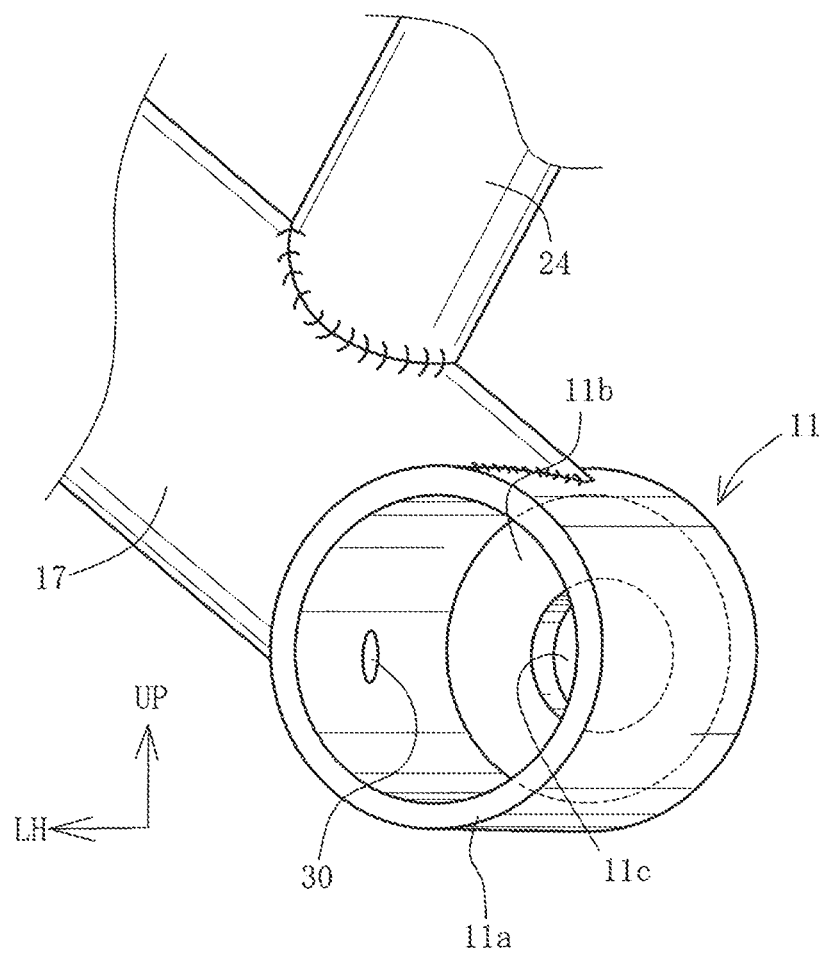
FIG. 6 is a perspective view of a first engine hanger and neighboring elements showing an atmospheric air communicating hole portion.

FIG. 6 is a perspective view of the first engine hanger 11 and associated elements showing a region around the atmospheric air communicating hole 30. As shown in FIG. 6, the first engine hanger 11 is a bottomed tubular member that supports the engine against vibration by fitting a rubber bush (not shown) in the inside space of a tubular portion 11a thereof and connecting the rubber bush to the engine by a bolt (not shown) fitted in a bolt fitting hole 11c formed in a bottom portion 11b. The second engine hanger 12 is a similar member.

At a portion of a side face of the tubular portion 11a which opposes to the rear end opening of the lower frame 17, the atmospheric air communicating hole 30 is provided.

Referring back to FIG. 5, as shown in an enlarged portion A, the atmospheric air communicating hole 30 is formed at a portion of the tubular portion 11a to which the lower frame 17 is connected so as to extend through the tubular portion 11a between the inside and the outside thereof in a diametrical direction and is open downwardly. The atmospheric air communicating hole 30 communicates the hollow space 17S of the lower frame 17 and the inside space of the tubular portion 11a of the first engine hanger 11 with each other. Since the inside space of the tubular portion 11a is open at the opposite ends in the tube axis direction thereof to the atmospheric air, the hollow space 17S of the lower frame 17 is open to the atmospheric air through the atmospheric air communicating hole 30. Accordingly, the lower frame 17 is connected at the rear end portion thereof in a communicating relationship to the first engine hanger 11 and is closed at the rear end opening thereof in a communicating state by the first engine hanger 11.

Since the atmospheric air communicating hole 30 is formed by providing a communicating hole in the tubular portion 11a of the first engine hanger 11, which is a cylindrical member of a comparatively small size, the atmospheric air communicating hole 30 can be formed readily and the workability is improved. It is to be noted that the atmospheric air communicating hole 30 is positioned in the proximity of a portion of the lower frame 17 that is on the lowest side such that discharge of liquid (water or liquid point) entering the hollow space 17S is facilitated and accelerated.

To a front end portion of the lower frame 17 that neighbors with the rear side of the head pipe 5, a front end portion of the first reinforcing frame 21 is connected. At the communication portion, the hollow space 17S of the lower frame 17 and the hollow space 21S of the first reinforcing frame 21 are communicated with each other by a first air vent port 31 formed open on a side face of the lower frame 17 as shown an enlarged view B in FIG. 5. The first air vent port 31 is an air vent port formed through the side face of the lower frame 17.

An enlarged portion surrounded by a circle in FIG. 2 is a view showing the first air vent port 31 from a direction of an axial line of the first reinforcing frame 21 (direction indicated by arrow mark X in FIG. 2), and the first reinforcing frame 21 is shown in a transverse plane in a direction perpendicular to the axial direction. As seen in FIG. 2, the first air vent port 31 is provided at a portion of the side face of the lower frame 17 surrounded by an open end portion of the first reinforcing frame 21 such that it extends through the lower frame 17 and communicates the hollow space 17S of the lower frame 17 and the hollow space 21S of the first reinforcing frame 21 with each other. In particular, although the open end portion of the first reinforcing frame 21 is closed by the lower frame 17, it is not closed fully but is closed in a communicating state because it is communicated by the first air vent port 31 and besides is connected in a communicating state to the side face of the upper end portion of the lower frame 17.

Further, the first air vent port 31 is surrounded by the end portion opening of the first reinforcing frame 21 abutted with the side face of the lower frame 17 such that it is not observed from the outside and is thus formed as a hidden hole that is not observed from the outside. To use a structure wherein an air vent port formed on a side face of one of two hollow members connected to each other is hidden by an end portion opening of the other hollow member abutted with the one hollow member, that is, to use the structure shown in the enlarged portion in FIG. 2, similarly applies also to the other vent holes that include the atmospheric air communicating hole 30.

The first air vent port 31 is open only to the inside of the lower frame 17 and the first reinforcing frame 21 such that air in the first reinforcing frame 21 expanded by heat upon welding is dissipated to the hollow space 17S of the lower frame 17. Further, as hereinafter described, expanded air in the upper frame 18 side can be dissipated similarly to the lower frame 17 through the first reinforcing frame 21 and the first air vent port 31. It is to be noted that the expanded air generated in the hollow space 17S of the lower frame 17 by welding is dissipated from the atmospheric air communicating hole 30 into the atmospheric air.

The rear ends of the first reinforcing frame 21 and the second reinforcing frame 22 and the front end of the fifth reinforcing frame 25 are connected to a side face of a front portion of the upper frame 18, and at the connecting portions, second air vent ports 32 are provided on a lower side face of the upper frame 18 as shown in an enlarged portion C in FIG. 5. Openings on the upper end side in FIG. 5 of the first reinforcing frame 21, second reinforcing frame 22 and fifth reinforcing frame 25 are closed in a communicating state by the upper frame 18.

Three second air vent ports 32 are provided similarly to the first air vent port 31 and juxtaposed with each other in the forward and backward direction. The second air vent ports 32 are air vent ports formed so as to extend through the side face of the upper frame 18. The second air vent port 32 on the front side communicates the hollow space 21S of the first reinforcing frame 21 and the hollow space 18S of the upper frame 18 with each other such that expanded air by welding in the upper frame 18 is dissipated to the first reinforcing frame 21 side.

The second air vent port 32 at the intermediate position in the forward and backward direction communicates the hollow space 22S of the second reinforcing frame 22 and the hollow space 18S of the upper frame 18 with each other such that expanded air by welding in the second reinforcing frame 22 is dissipated to the upper frame 18 side.

The second air vent port 32 on the rear side communicates the hollow space 25S of the fifth reinforcing frame 25 and the hollow space 18S of the upper frame 18 with each other such that expanded air by welding in the fifth reinforcing frame 25 is dissipated to the upper frame 18 side.

The fourth reinforcing frame 24 is connected at an upper (rear) end portion thereof in a communicating state to a side face of a rear end portion of the third reinforcing frame 23. At the connecting portion, the hollow space 24S of the fourth reinforcing frame 24 and the hollow space 23S of the third reinforcing frame 23 are communicated with each other by a third air vent port 33 provided on the third reinforcing frame 23 side as shown in an expanded portion D in FIG. 5. Thus, expanded air by welding in the fourth reinforcing frame 24 is dissipated to the third reinforcing frame 23 by the third air vent port 33. The third air vent port 33 is an air vent port provided in a reinforcing frame.

The third reinforcing frame 23 is abutted and welded at a rear end portion thereof with and to a front side face of the second engine hanger 12 and is connected also to a lower end portion of the fifth reinforcing frame 25 by welding.

The connection between the third reinforcing frame 23 and the fifth reinforcing frame 25 is provided such that an obliquely cut portion is provided at each of a rear end portion of the third reinforcing frame 23 and a lower end portion of the fifth reinforcing frame 25 and the inclined cut portions are abutted with and welded to each other to form the butt welded portion 27. The hollow space 23S of the third reinforcing frame 23 and the hollow space 25S of the fifth reinforcing frame 25 are communicated with each other in the inside of the butt welded portion 27.

The fifth reinforcing frame 25 is abutted and welded at a lower end portion thereof with and to the front side face of the second engine hanger 12 and is connected at the lower end portion thereof to the rear end portion of the third reinforcing frame 23 in a communicating state by welding as described hereinabove. Further, the openings at the rear end portion of the third reinforcing frame 23 and the lower end portion of the fifth reinforcing frame 25 are closed with the second engine hanger 12. An atmospheric air open hole like the atmospheric air communicating hole 30 is not formed in the second engine hanger 12.

Accordingly, expanded air by welding in the third reinforcing frame 23 and the fourth reinforcing frame 24 can be dissipated to the fifth reinforcing frame 25 through the communicating portion formed on the inner side of the butt welded portion 27 provided at the lower end portion of the fifth reinforcing frame 25.

Although the sixth reinforcing frame 26 is closed at the front end thereof with the second engine hanger 12, it is abutted and welded at a rear end portion thereof with and to a lower side face of a rear end portion of the upper frame 18. As shown in an expanded portion E in FIG. 5, the hollow space 26S of the sixth reinforcing frame 26 and the hollow space 18S of the upper frame 18 are communicated with each other by the second air vent port 32 provided in the upper frame 18. The second air vent port 32 is provided similarly to the other second air vent ports 32 provided forwardly and can dissipate expanded air by welding in the sixth reinforcing frame 26 into the upper frame 18.

It is to be noted that, although the second reinforcing frame 22, third reinforcing frame 23 and fourth reinforcing frame 24 are welded to the lower frame 17, such a first air vent port 31 as is provided at the welded portion to the first reinforcing frame 21 is not provided, and the openings of them on the lower frame 17 side are closed in a non-communicating relationship with the lower frame 17.

This is because the atmospheric air communicating hole 30 is provided at the lower end portion of the lower frame 17 and the first air vent port 31 is provided at the upper end portion of the lower frame 17 while such a through-hole as a different air vent port is not provided at an intermediate portion of the lower frame 17. Consequently, minimum required air vent ports are assured while fluid is prevented from entering the upper frame 18 side from the intermediate portion of the lower frame 17 positioned below the first air vent port 31. Besides, the number of through-holes in the lower frame 17 is reduced as far as possible so that required strength can be assured.

It is to be noted that also the main frame 7 on the right side is configured similarly and has an air venting structure same as that of the main frame 7 on the left side. In particular, although both of the left and right main frames 7 include the atmospheric air communicating hole 30 and the first air vent port 31, second air vent port 32 and third air vent port 33 similarly, they are closed at front end portions thereof with the head pipe 5 and are closed at rear end portions thereof with the first engine hanger 11 and the attachment piece 13 such that they are not communicated with each other, as shown in FIGS. 3 and 4.

In short, each of the left and right main frames 7 includes only one atmospheric air communicating hole 30, which is a single atmospheric pressure opening hole, and air can be removed from the left and right main frames 7 separately from each other through the atmospheric air communicating holes 30 into the atmospheric air.

However, as shown in FIGS. 3 and 4, each of the first cross pipe 28 and the second cross pipe 29 requires an air vent port because they are welded individually at the opposite left and right end portions thereof to the left and right lower frames 17 and upper frames 18. Therefore, in the present example, a fourth air vent port 34 and a fifth air vent port 35 are provided only at the connecting portions to the lower frame 17 and the upper frame 18 that configure the main frame 7, respectively. It is to be noted that, since the fourth air vent port 34 and the fifth air vent port 35 are formed in the lower frames 17 and the upper frames 18, respectively, they belong to the first air vent port 31 and the second air vent port 32. However, in order to make it distinct that they are provided for connection to the cross pipes, specifically they are named as such.

As shown in the enlarged portions A and B in FIG. 4, the fourth air vent port 34 is provided in the lower frame 17 and the hollow space 28S of the first cross pipe 28 and the hollow space 17S of the lower frame 17 are communicated with each other, and the fifth air vent port 35 is provided in the upper frame 18 and the hollow space 29S of the second cross pipe 29 and the hollow space 18S of the upper frame 18 are communicated with each other. Consequently, expanded air by welding of the first cross pipe 28 and the second cross pipe 29 is dissipated to the main frame 7 on the left side.

At this time, as shown in enlarged portions C and D in FIG. 4, no air vent port is provided at the connecting portion between the lower frame 17 of the main frame 7 on the right side and the first cross pipe 28 and the connecting portion between the upper frame 18 of the main frame 7 on the right side and the second cross pipe 29. Consequently, the first cross pipe 28 and the second cross pipe 29 are not communicated with the main frame 7.

By the configuration just described, expanded air by welding of the first cross pipe 28 and the second cross pipe 29 can be dissipated sufficiently only by the fourth air vent port 34 and the fifth air vent port 35. Further, since the fourth air vent port 34 and the fifth air vent port 35 are not provided in the main frame 7 on the right side, the number of through-holes to be provided in the lower frame 17 and the upper frame 18 is reduced so that necessary strength for the main frame 7 can be readily assured. Particularly, since the first cross pipe 28 and the second cross pipe 29 are reinforcing members for the leftward and rightward direction of the vehicle body, intensity enhancement by such consideration is effective.

It is to be noted that the fourth air vent port 34 and the fifth air vent port 35 can be provided arbitrarily not in the main frame 7 on the left side but in the main frame 7 on the right side. Also it is possible to provide one of the fourth air vent port 34 and the fifth air vent port 35 in the main frame 7 on the left side but provide the other one of the fourth air vent port 34 and the fifth air vent port 35 in the main frame 7 on the right side separately.

Now, venting of air in the frame upon assembly by welding is described. When the main frame 7 is assembled by welding, since high heat is generated by welding of the pipe members and so forth and the air in the hollow space is thermally expanded, air venting is required. On the other hand, since the left and right main frames 7 are configured such that the communication of the main frame space formed as one space by mutual communication of the pipe members thereof is established by the air vent ports and so forth and is open to the atmospheric air through the atmospheric air communicating hole 30, the air can be removed quickly through the atmospheric air communicating hole 30.

In particular, as seen in FIG. 5, upon welding of the attachment piece 13 and the sixth reinforcing frame 26 to the upper frame 18, expanded air flows as indicated by arrow marks a→b→c→d→e. Thus, the expanded air is dissipated along the route of the hollow space 18S of the upper frame 18→second air vent port 32→hollow space 21S of the first reinforcing frame 21→first air vent port 31→hollow space 17S of the lower frame 17→atmospheric air communicating hole 30→inside space of the tubular portion 11a of the first engine hanger 11→atmospheric air. In the following description, this route is referred to as basic air venting route.

It is to be noted that expanded air by welding of the second engine hanger 12 and the sixth reinforcing frame 26 can be dissipated into the hollow space 18S of the upper frame 18 as indicated by an arrow mark f. From the hollow space 18S of the upper frame 18, air is dissipated into the atmospheric air along the basic air venting route described above.

Expanded air by welding between the second engine hanger 12 and the third reinforcing frame 23 and fifth reinforcing frame 25 enters the hollow space 25S of the fifth reinforcing frame 25 as indicated by the arrow mark g and can be dissipated from the second air vent port 32 into the hollow space 18S of the upper frame 18 as further indicated by an arrow mark h.

At this time, the expanded air generated in the third reinforcing frame 23 side enters the hollow space 25S from the hollow space 23S through the communicating path formed in the butt welded portion 27. Further, since the third reinforcing frame 23 is connected in a non-communicating state to the lower frame 17, also expanded air generated by welding to the lower frame 17 enters the hollow space 25S of the fifth reinforcing frame 25 as indicated by an arrow mark g through the communicating path in the butt welded portion 27. Furthermore, also expanded air generated in the hollow space 23S by welding between the third reinforcing frame 23 and the fourth reinforcing frame 24 enters the hollow space 25S of the fifth reinforcing frame 25 as indicated by the arrow mark g through the communicating portion in the butt welded portion 27.

Expanded air generated by welding to the lower frame 17 in the fourth reinforcing frame 24 connected in a non-communicating state to the lower frame 17 enters the hollow space 23S of the third reinforcing frame 23 from the hollow space 24S through the third air vent port 33 as indicated by an arrow mark i and further enters the hollow space 25S of the fifth reinforcing frame 25 as indicated by the arrow mark g through the communicating portion in the butt welded portion 27.

Expanded air generated by welding to the lower frame 17 in the second reinforcing frame 22 connected in a non-communicating state to the lower frame 17 enters the hollow space 18S of the upper frame 18 from the hollow space 22S through the second air vent port 32 as indicated by an arrow mark j.

Accordingly, expanded air generated upon assembly by welding in the frame space formed by communication of the hollow spaces in the pipe members can be dissipated to the atmospheric air through the single atmospheric air communicating hole 30, regardless of whichever welding place the expanded air is generated.

It is to be noted that, since the left and right main frames 7 are integrated with each other in a non-communicating state by the head pipe 5, air venting from the atmospheric air communicating hole 30 is carried out separately by the left and right main frames 7.

At this time, expanded air generated in the lower frame 17 and the upper frame 18 by welding to the head pipe 5 is removed separately for the left and right also along the basic air venting route or a route of arrow marks d→e which passes the atmospheric air communicating hole 30 from the lower frame 17.

Further, the first cross pipe 28 and the second cross pipe 29 are connected in a non-communicating state to the right side main frame 7 and connected in a communicating state only to the left side main frame 7. Accordingly, expanded air generated in the first cross pipe 28 and the second cross pipe 29 upon welding flows only into the left side main frame 7 from the fourth air vent port 34 and the fifth air vent port 35 and is removed.

At this time, since the fourth air vent port 34 is positioned in the proximity of the connecting portion of the lower frame 17 to the second reinforcing frame 22, the expanded air of the first cross pipe 28 enters the hollow space 17S of the lower frame 17 and is removed along the route indicated by the arrow marks d→e.

Further, since the fifth air vent port 35 is provided in the proximity of the upper end portion side connecting portion of the upper frame 18 to the second reinforcing frame 22, the expanded air of the second cross pipe 29 enters the hollow space 18S of the upper frame 18 and is thereafter removed along the basic air venting route.

If only one atmospheric air communicating hole 30 is provided as an atmospheric air opening hole in this manner, then the number of air venting holes can be reduced as far as possible, and since the other air venting holes are not formed observably from the outside, the outer appearance can be improved. Therefore, a suitable frame for a motorcycle to which outer appearance importance is attached is obtained. Besides, since the atmospheric air communicating hole 30 is provided such that it extends through the tubular portion 11a of the first engine hanger 11 between the inside and the outside of the same in a diametrical direction perpendicular to the axis of the tubular portion 11a, it is little observed from the outside. Therefore, the outer appearance is further improved.

Further, since the atmospheric air communicating hole 30 is provided in the first engine hanger 11 which is a rear (lower) end portion of the lower frame 17 and is open downwardly toward the inner space of the tubular portion 11a, liquid such as water hardly intrudes. Further, even if liquid should intrude, it can be discharged readily from the atmospheric air communicating hole 30 provided at a lower end portion of the lower frame 17.

Besides, since, in the completed vehicle after assembly, a bush is fitted in the tubular portion 11a of the first engine hanger 11 and the atmospheric air communicating hole 30 which faces the inner face of the tubular portion 11a is closed up by the bush, the atmospheric air communicating hole 30 is not observed at all from the outside. Consequently, the outer appearance can be further improved, and intrusion of liquid can be prevented with a higher degree of accuracy.

Now, coating of the front frame assembly 40 assembled by integral connection of the left and right main frames 7 by the head pipe 5 and the first cross pipe 28 and second cross pipe 29 is described. In the present example, the front frame assembly 40 is electrodeposition coated by dipping into liquid paint. However, the coating is not limited to electrodeposition coating only if dipping is applied.

FIG. 7 is a view illustrating a coating step. Referring to FIG. 7, the front frame assembly 40 suspended by hooking the head pipe 5 by means of a hook 41 is dipped from above into liquid paint 42 filled in a paint tank.

In the suspended state, the lower frame 17 and the upper frame 18 are disposed long in the upward and downward direction such that they extend substantially perpendicularly to the liquid surface 43 such that the lower frame 17 and the upper frame 18 are relatively positioned such that the lower frame 17 is positioned on the upper side and the upper frame 18 is positioned on the lower side. Further, the first engine hanger 11 is positioned at a lower end of the lower frame 17 and the attachment piece 13 is positioned at a lower end of the upper frame 18, and the first engine hanger 11 is positioned above the attachment piece 13.

Further, the lower frame 17 is positioned such that the atmospheric air communicating hole 30 is positioned at a lower end portion and the first air vent port 31 is positioned at an upper end portion such that they are most spaced upwardly and downwardly from each other.

Therefore, after dipping of the front frame assembly 40 is started, the lower half portion side of the upper frame 18 enters the liquid paint 42 beginning with the attachment piece 13.

However, since the front frame assembly 40 does not have any through-hole that communicates with the outer side other than the atmospheric air communicating hole 30 provided in the first engine hanger 11, at a stage at which the first engine hanger 11 is positioned higher than the liquid surface 43, the liquid paint 42 does not enter the front frame assembly 40 from the portion dipped in the liquid paint 42.

If the first engine hanger 11 soon reaches the liquid surface 43 and begins to enter the liquid paint 42, then the atmospheric air communicating hole 30 which is the single through-hole enters the liquid paint 42. Consequently, the liquid paint 42 tends to enter the lower frame 17 through the atmospheric air communicating hole 30.

However, the lower frame 17 extends long in the upward and downward direction and is closed at the opposite upper and lower ends thereof with the head pipe 5 and the first engine hanger 11 while it is communicated only at one place of the atmospheric air communicating hole 30 provided in the first engine hanger 11 at the lower end portion thereof with the outside and is communicated only at the first air vent port 31 provided at an upper end portion thereof with the main frame space on the upper frame 18 side. Besides, the main frame space is formed by communication of the hollow spaces of the pipe members that configure the front frame assembly 40 and is a closed space with respect to the outside except through the atmospheric air communicating hole 30.

Accordingly, if the atmospheric air communicating hole 30 is closed up with the liquid paint 42 by being submerged in the liquid paint 42, then the main frame space becomes a fully enclosed space. Thus, the pressure of the air confined in the enclosed space exerts resistance to entering of the liquid paint 42 into the lower frame 17 through the atmospheric air communicating hole 30. Further, since the atmospheric air communicating hole 30 is positioned at a lower end portion of the lower frame 17, the air in the lower frame 17 is positioned higher than the atmospheric air communicating hole 30 and is likely to be confined and besides is less likely to be dissipated into the liquid paint 42 through the atmospheric air communicating hole 30 at the lower end portion.

Therefore, even if the liquid paint 42 tends to enter the lower frame 17 through the atmospheric air communicating hole 30, this is blocked. Further, even if the liquid paint 42 enters, the amount thereof is limited.

Further, since the atmospheric air communicating hole 30 is provided at a lower end portion of the lower frame 17 and the first air vent port 31 is provided at an upper end portion of the lower frame 17 while no other through-hole such as an air vent port is provided at an intermediate portion of the lower frame 17, even if the liquid paint 42 advances a little into the hollow space 17S through the atmospheric air communicating hole 30 at the lower end portion, the liquid cannot advance from an intermediate portion of the lower frame 17 below the first air vent port 31 to the upper frame 18 side.

Besides, since the liquid paint 42 entering the hollow space 17S does not reach the first air vent port 31 at the upper end portion, the situation that the liquid paint 42 advances to the upper frame 18 side can be prevented. Therefore, even if the liquid paint 42 should enter the hollow space 17S, it remains in the hollow space 17S, and therefore, if the front frame assembly 40 is pulled upwardly from the paint liquid tank, then the liquid paint 42 in the hollow space 17S is discharged to the outside through the atmospheric air communicating hole 30 readily and rapidly.

If the atmospheric air communicating hole 30 is closed up with the liquid paint 42, then even if the atmospheric air communicating hole 30 thereafter moves further deeply into the liquid paint 42, since advancement of the liquid paint 42 into the lower frame 17 still remains blocked, if the front frame assembly 40 is soon immersed fully into the liquid paint 42, intrusion of the liquid paint 42 still remains blocked.

Accordingly, even if the front frame assembly 40 is dipped into the liquid paint 42 for coating, intrusion thereof into the inside of the liquid paint 42 can be blocked or minimized, and the discharging step of the intruding liquid paint after the painting can be omitted or minimized. Therefore, even though the atmospheric air communicating hole 30 which is essentially required for assembly by welding is provided, later painting can be facilitated.

It is to be noted that the invention of the present application is not limited to the embodiment described above but allows various modifications and applications without departing from the subject matter of the invention.

For example, the vehicle to which the frame of the present invention is applied may be a saddle type vehicle other than a motorcycle. Also the frame for a motorcycle is not limited to a main frame but may be a seat rail which configures a rear portion side of a vehicle body frame (which includes upper and lower pipe members).

As the hollow members, at least the first hollow member, second hollow member and third hollow member are required, and an arbitrary number of hollow members may be provided. For example, also the number of reinforcing frames may be arbitrarily selected except the first reinforcing frame which is essentially required.

Further, the hollow members may be simple round pipes or angular pipes formed by drawing or may be formed by sticking two exterior parts together at the edges thereof.

DESCRIPTION OF REFERENCE NUMBERS

3: Vehicle body frame, 7: Main frame, 17: Lower frame, 18: Upper frame, 21: First reinforcing frame, 22: Second reinforcing frame, 23: Third reinforcing frame, 24: Fourth reinforcing frame, 25: Fifth reinforcing frame, 26: Sixth reinforcing frame, 28: First cross pipe, 29: Second cross pipe, 30: Atmospheric air communicating hole, 31: First air vent port, 32: Second air vent port, 33: Third air vent port, 34: Fourth air vent port, 35: Fifth air vent port, 40: Front frame assembly, 42: Liquid paint, 43: Liquid surface

What is claimed is:

1. A hollow welded assembled frame structure wherein a plurality of hollow members of a tubular shape are integrally assembled by connecting the hollow members to each other by welding, wherein:
   said hollow members include at least a first hollow member, a second hollow member, and a third hollow member;
   said first hollow member is closed at openings at opposite ends in a lengthwise direction thereof and has only one atmospheric air communicating hole provided at one end portion in the lengthwise direction thereof so as to communicate an internal hollow space thereof and the atmospheric air with each other;
   said second hollow member is welded at an opening at one end in a lengthwise direction thereof to a side face of said first hollow member in a state in which said second hollow member is abutted with the side face of said first hollow member and is connected in a communicating state through a first air vent port, which is provided at a connecting portion of said second hollow member and communicates the hollow spaces of said first hollow member and said second hollow member with each other;
   said third hollow member is closed up at openings at opposite ends in a lengthwise direction thereof and has a side face to which said second hollow member is welded at the other end thereof in a state in which the other end of said second hollow member is abutted with the side face of said third hollow member such that said third hollow member is connected to said second hollow member in a communicating state through a second air vent port, which is provided at a connecting portion of said third hollow member and communicates hollow spaces of said third hollow member and said second hollow member with each other;
   said first air vent port and said second air vent port are formed as hidden holes that are hidden by the second hollow member welded with the openings abutted therewith so as not to be observed from outside; and said first air vent port is provided at a position spaced by a predetermined distance from said atmospheric air communicating hole in the lengthwise direction of said first hollow member.

2. The hollow welded assembled frame structure according to claim 1, wherein:

said hollow welded assembled frame structure includes a main frame that which extends rearwardly from an upper portion of a head pipe as viewed in side elevation of a saddle type vehicle;

said main frame includes an upper frame and a lower frame provided in an upwardly and downwardly spaced relationship to each other, and a plurality of reinforcing frames each formed from a hollow member and connecting said upper frame and lower frames to each other;

said lower frame serves as the first hollow member and has the atmospheric air communicating hole provided at a lower end portion thereof;

said upper frame serves as the third hollow member;

a first reinforcing frame of said plurality of reinforcing frames, which is positioned adjacent said head pipe, serves as the second hollow member;

said lower frame and said first reinforcing frame are connected in a communicating state with each other through said first air vent port; and said upper frame and said first reinforcing frame are connected in a communicating state with each other through said second air vent port.

3. The hollow welded assembled frame structure according to claim 2, wherein said plurality of reinforcing frames include a second reinforcing frame, said second reinforcing frame is disposed rearwardly of said first reinforcing frame and is connected at one end thereof to said lower frame in a non-communicating state between said atmospheric air communicating hole and said first air vent port and at the other end thereof to said upper frame in a communicating state.

4. The hollow welded assembled frame structure according to claim 2, wherein said plurality of reinforcing frames include a third reinforcing frame and a fourth reinforcing frame that are disposed rearwardly of said first reinforcing frame and are connected at respective one ends thereof to said lower frame in a non-communicating state between said atmospheric air communicating hole and said first air vent port, and said third reinforcing frame and said fourth reinforcing frame are connected at the other ends thereof to each other in a communicating state, and are also connected to said upper frame in a communicating state through a fifth hollow member which is a different hollow member.

5. The hollow welded assembled frame structure according to claim 2, wherein a lower end opening of said lower frame is connected by an engine hanger of a cylindrical shape disposed in the vehicle widthwise direction, and said atmospheric air communicating hole is formed in a cylindrical portion of said engine hanger.

6. The hollow welded assembled frame structure according to claim 2, wherein a pair of left and right main frames are provided and connected to and integrated by said head pipe and are connected to each other in a non-communicating state, and each of said left and right main frames includes said atmospheric air communicating hole.

7. The hollow welded assembled frame structure according to claim 6, wherein the hollow welded assembled frame includes hollow cross members extending in the vehicle widthwise direction, for connecting said left and right main frames to each other, and said cross members connect on one end sides thereof in a communicating state and on the other end sides thereof in a non-communicating state to said left and right main frames.

8. The hollow welded assembled frame according to claim 7, wherein said cross members include a first cross member and a second cross member provided upwardly and downwardly;

said first cross member connects the left and right lower frames to each other; and said second cross member connects the left and right upper frames to each other.

9. The hollow welded assembled frame according to claim 1, wherein said hollow welded assembled frame structure is coated by dipping the same into liquid paint after assembly by welding thereof;

upon the painting, said first hollow member is disposed above a liquid surface of the fluid paint such that a lengthwise direction thereof is directed in an upward and downward direction; and in this arrangement state, said atmospheric air communicating hole is open downwardly at a lower end portion thereof while said first air vent port is provided so as to be positioned on an upper end portion side.

10. The hollow welded assembled frame structure according to claim 3, wherein said plurality of reinforcing frames include a third reinforcing frame and a fourth reinforcing frame that are disposed rearwardly of said first reinforcing frame and are connected at respective one ends thereof to said lower frame in a non-communicating state between said atmospheric air communicating hole and said first air vent port, and said third reinforcing frame and said fourth reinforcing frame are connected at the other ends thereof to each other in a communicating state, and are also connected to said upper frame in a communicating state through a fifth hollow member which is a different hollow member.

11. The hollow welded assembled frame structure according to claim 3, wherein a lower end opening of said lower frame is connected by an engine hanger of a cylindrical shape disposed in the vehicle widthwise direction, and said atmospheric air communicating hole is formed in a cylindrical portion of said engine hanger.

12. The hollow welded assembled frame structure according to claim 3, wherein a pair of left and right main frames are provided and connected to and integrated by said head pipe and are connected to each other in a non-communicating state, and each of said left and right main frames includes said atmospheric air communicating hole.

13. The hollow welded assembled frame structure according to claim 12, wherein the hollow welded assembled frame includes hollow cross members extending in the vehicle widthwise direction, for connecting said left and right main frames to each other, and said cross members connect on one end sides thereof in a communicating state and on the other end sides thereof in a non-communicating state to said left and right main frames.

14. The hollow welded assembled frame according to claim 13, wherein said cross members include a first cross member and a second cross member provided upwardly and downwardly;

said first cross member connects the left and right lower frames to each other; and said second cross member connects the left and right upper frames to each other.

15. The hollow welded assembled frame according to claim 3, wherein said hollow welded assembled frame structure is coated by dipping the same into liquid paint after assembly by welding thereof;

upon the painting, said first hollow member is disposed above a liquid surface of the fluid paint such that a lengthwise direction thereof is directed in an upward and downward direction; and in this arrangement state, said atmospheric air communicating hole is open downwardly at a lower end portion thereof while said first air vent port is provided so as to be positioned on an upper end portion side.

16. The hollow welded assembled frame structure according to claim 4, wherein a lower end opening of said lower frame is connected by an engine hanger of a cylindrical shape disposed in the vehicle widthwise direction, and said atmospheric air communicating hole is formed in a cylindrical portion of said engine hanger.

17. The hollow welded assembled frame structure according to claim 4, wherein a pair of left and right main frames are provided and connected to and integrated by said head pipe and are connected to each other in a non-communicating state, and each of said left and right main frames includes said atmospheric air communicating hole.

18. The hollow welded assembled frame structure according to claim 17, wherein the hollow welded assembled frame includes hollow cross members extending in the vehicle widthwise direction, for connecting said left and right main frames to each other, and said cross members connect on one end sides thereof in a communicating state and on the other end sides thereof in a non-communicating state to said left and right main frames.

19. The hollow welded assembled frame according to claim 18, wherein said cross members include a first cross member and a second cross member provided upwardly and downwardly;

said first cross member connects the left and right lower frames to each other; and said second cross member connects the left and right upper frames to each other.

20. The hollow welded assembled frame according to claim 14, wherein said hollow welded assembled frame structure is coated by dipping the same into liquid paint after assembly by welding thereof;

upon the painting, said first hollow member is disposed above a liquid surface of the fluid paint such that a lengthwise direction thereof is directed in an upward and downward direction; and in this arrangement state, said atmospheric air communicating hole is open downwardly at a lower end portion thereof while said first air vent port is provided so as to be positioned on an upper end portion side.

* * * * *